United States Patent [19]

McCloskey

[11] 3,893,736
[45] July 8, 1975

[54] SELF-ADJUSTING BEARING

[75] Inventor: Albert R. McCloskey, Fairfield, Conn.

[73] Assignee: Rockwell International Corporation, Pittsburgh, Pa.

[22] Filed: Jan. 21, 1974

[21] Appl. No.: 434,934

[52] U.S. Cl. .............................. 308/72; 308/238
[51] Int. Cl. ...... F16c 9/06; F16c 23/08; F16c 27/04
[58] Field of Search ............... 29/148.4 A, 149.5 B; 277/112; 308/72, 238

[56] References Cited
UNITED STATES PATENTS

| 2,675,283 | 4/1954 | Thompson | 308/238 |
| 3,020,101 | 2/1962 | McCaslin | 308/72 |
| 3,069,178 | 12/1962 | Rosen | 277/112 |
| 3,089,221 | 5/1963 | Barr | 29/148.4 A |
| 3,266,123 | 8/1966 | McCloskey | 29/149.5 B |
| 3,655,249 | 4/1972 | Abel | 308/72 |

Primary Examiner—M. Henson Wood, Jr.
Assistant Examiner—Howard Beltran

[57] ABSTRACT

A spherical bearing assembly having an inner race member and an outer race member, the inner surface of the outer race member being a concave spherical surface, the outer surface of the inner member being a complimentary convex spherical surface, the inner member including a spool member and at least three spherical segments interlocked, in an axial direction, on the spool member.

1 Claim, 12 Drawing Figures 3,893,736

SELF-ADJUSTING BEARING

BACKGROUND OF THE INVENTION

The present invention relates generally to self-aligning bearings having a ball-like inner member with a convex outer surface and an outer member having an inner surface with a complimentary concave spherical inner face. These types of bearings, which are commonly called "spherical bearings", have been utilized in industry for a substantial period of time. The technological evolution of these type bearings has been directed more in the terms of material composition of its various component parts rather than toward basic changes in design concepts. Accordingly, the design advances in spherical bearings have not been substantial in nature and thereby presently limiting their applications.

One area in which the spherical bearings have been extensively applied is the aircraft industry. This is due to the spherical bearing self-aligning characteristic. A typical such application is marrying of a spherical bearing to a landing gear strut or member of an airplane. In this application the outer race is commonly press-fitted and/or stacked into a housing or the like rendering it difficult to remove and/or maintain. When any such maintenance is required, such as replacing of the ball, the entire bearing assembly including the inner and outer race member would have to be removed and replaced by an entirely new bearing assembly. Such an operation could entail substantial expense and down time of the entire aircraft.

There are a number of prior art type spherical bearings which have been addressed to this kind of problem. One such type prior art bearing is the "messerschmidt" bearing. A concept of this bearing is that the ball can be removed in the field without disassembling the entire bearing, that is, removing the outer race member from its mounting. The messerschmidt type spherical bearing has proved somewhat unsatisfactory in that its overall bearing surface is decreased by the provision of a slot. This decrease or rather limited bearing surface area has a marked negative effect on the bearing performance characteristics.

SUMMARY OF THE INVENTION

It is therefore, a primary object of the present invention to provide a spherical bearing assembly having an inner race member and an outer race member, the inner surface of the outer race member being a concave spherical surface, the outer surface of the inner member being a complimentary convex spherical surface, said inner member including a spool member and at least three spherical segments interlocked, in an axial direction, with said spool member.

It is yet another object of the present invention to provide a spherical bearing assembly which has a rotational redundancy. That is, the inner member is adapted to be rotatably mounted within the outer member. A first bearing surface between these two members being defined by the convex outer surface of the inner member and the complimentary concave inner surface of the outer member. The rotational redundancy provided by the spherical bearing of the present invention is the second bearing surface between the longitudinal inner surface of the segments of the inner member and the cylindrical outer surface of the spool member.

It is still another object of the present invention to provide a spherical bearing assembly in accordance with the present invention wherein the spool member is provided with annular lips, one lip disposed at each end of the spool member.

It is still another object of the present invention to provide a spherical bearing assembly in accordance with the present invention wherein the annular lips of the spool member have an outer surface which is a continuation of the convex spherical surface of the inner member.

It is yet another object of the present invention to provide a spherical bearing assembly in accordance with the present invention wherein the annular lips on the spool member maintain the segments upon the spool member so as to mechanically interlock them thereon when the member is in its operational position.

It is still another object of the present invention to provide a spherical bearing assembly in which the annular lips are so sized that they may be rotated within the surface defined by the concave spherical surface of the outer member.

It is still another object of the present invention to provide a spherical bearing assembly in which there are three spherical segments, the segments providing substantially all of a first bearing surface between the inner member and the outer member.

It is still another object of the present invention to provide a spherical bearing assembly in which the concave inner surface is coated with a self-lubricating plastic such as "Teflon", a trademark of the DuPont Corporation.

It is yet another object of the present invention to provide a spherical bearing assembly in which the outer surface of the spool member is coated with a self-lubricating plastic material such as Teflon.

It is yet another object of the present invention to provide a spherical bearing assembly in which the outer surfaces of said inner member as defined by the spherical segments are coated with self-lubricating plastic such as Teflon.

Embodiments of the bearing according to the concept of the present invention are shown and/or described by way of example in the accompanying drawings and following description of the invention without attempting to show or describe all of the various forms and modifications in which the invention might be embodied; the invention being measured by the appended claims and not by the details of the specification.

DESCRIPTION OF THE INVENTION

Figure 1:
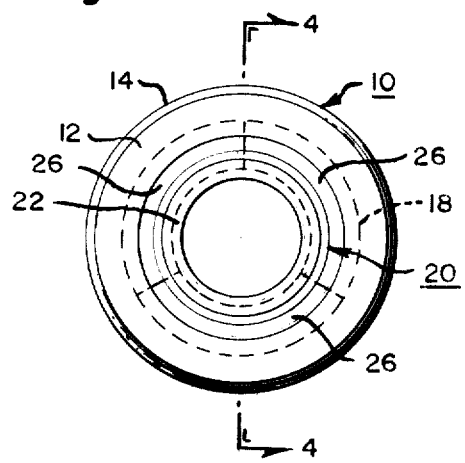
FIG. 1 is a side elevational view of the spherical bearing assembly embodying the present invention with the longitudinal axis of the outer race member and the inner race member being substantially coincident.
Figure 3:
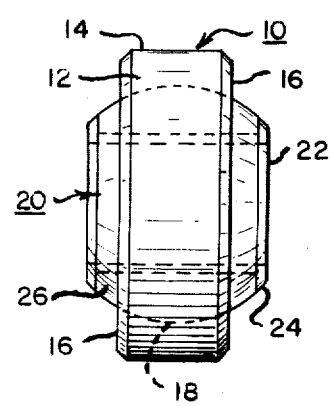
FIG. 3 is a front elevational view of the spherical bearing assembly of FIG. 1.
Figure 4:
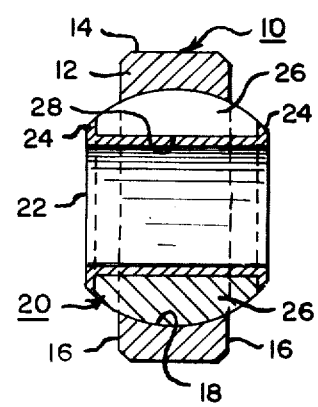
FIG. 4 is a front sectional view taken along line 4—4 of FIG. 1.
Figure 2:
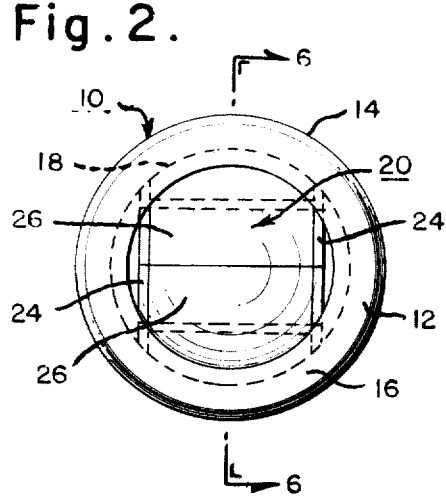
FIG. 2 is a side elevational view of the spherical bearing assembly embodying the present invention with the longitudinal axis of the inner race member and the outer race member being substantially perpendicular, that is, the inner race member has been rotated substantially 90° in one plane.
Figure 5:
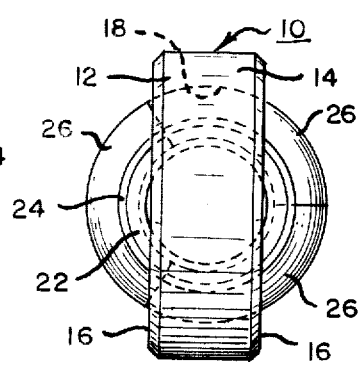
FIG. 5 is a front elevational view of the bearing of FIG. 2.
Figure 6:
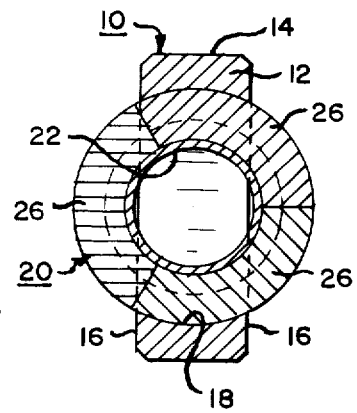
FIG. 6 is a front sectional view taken along line 6—6 of FIG. 2.
Figure 7:
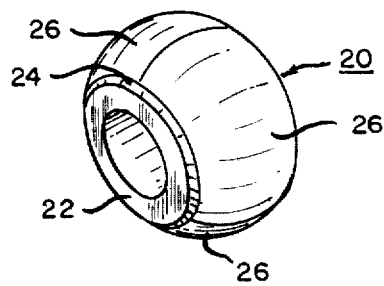
FIG. 7 is a perspective view of the inner race member alone in an assembled condition.
Figure 8C:
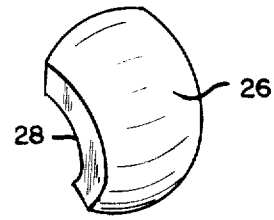
FIGS. 8a, 8b, 8c illustrate a perspective view of the component parts of the inner race member of FIG. 7.
Figure 8B:
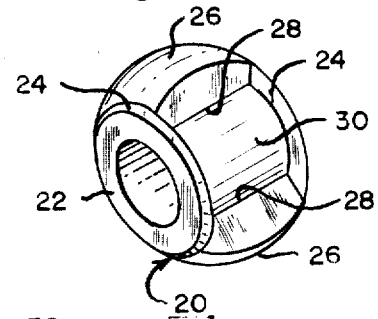
Figure 8A:
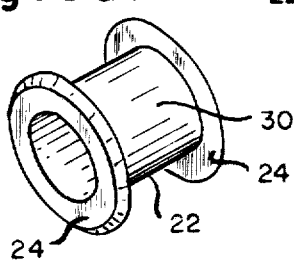
Figure 10:
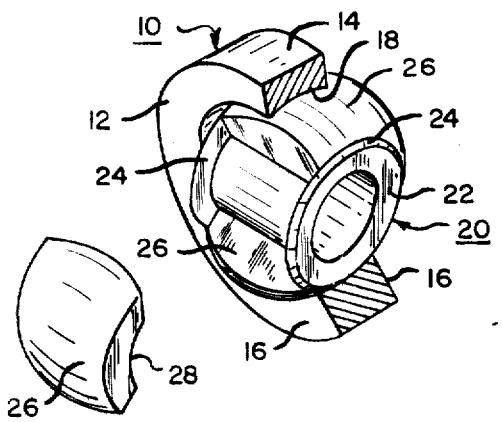
FIG. 10 is a perspective sectional view of the bearing of FIG. 2 with one of the segments of the inner race member removed.
Figure 9:
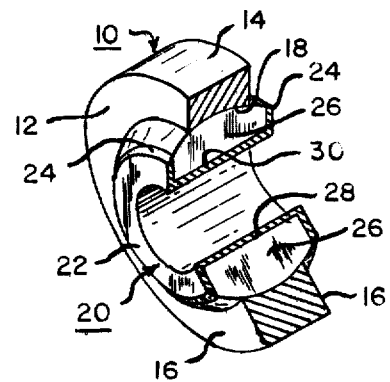
FIG. 9 is a perspective sectional view of the spherical bearing of FIG. 1.

A spherical bearing embodying the concept of the present invention is generally indicated, as appropriate, by numeral 10 on the attached drawing as set forth in FIGS. 1 through 10, inclusive.

The bearing 10 has been shown as a spherical bearing, however, the present invention is also directly applicable to male or female rod end type bearings and the like.

The spherical bearing 10 comprises an outer member 12 which may be provided with an outer cylindrical surface 14. The outer member 10 may also be provided with two annular faces 16. The outer member 12 is further provided with a concave spherical inner surface 18. It may be noted at this juncture that the outer member 12 may be similar to the outer race members as found in the prior art.

The basic thrust of the present invention is to be found in the inner member which is typically formed, in the prior art, as a single solid member. The inner member 20 as distinguished from the inner members of the prior art is a composite member having several parts. The basic part or member is the spool member 22. The spool member 22 may be characterized as a cylindrically shaped spool having two annular lips 24, one at each end thereof. The spool member 22 and the annular lips 24, are so sized as to be able to be placed within the surface defined by the concave inner surface 18 of the outer member 12. This can be best seen in FIGS. 2, 5, 6 and 10.

The spool member 22 and its various associated parts may be rotated such that its longitudinal axis is perpendicular to the longitudinal axis of the outer race member 12. When the spool member is rotated in such a fashion that the convex outer surface of the inner member 20 is exposed substantially all of the convex surface of the inner member which is formed and defined by at least three segments 26. There may be at least three equally sized segments 26 on the spool member 22. The annular lips 24 maintain the positional integrity, in an axial direction, of the segments 26 on the spool member 22. However, the segments 26 may be removed from the spool member 22 when the spool member is rotated in the above noted fashion. Each segment 26 may be moved in turn from the spool member 22 ultimately leaving the spool member completely devoid of the segments 26. Thereafter, the spool member can be removed entirely from the outer member 12. It can be seen, therefore, that the inner member can be completely dismantled and removed from the outer member 12 without dislodging or otherwise interferring with the position or the condition of the outer member with respect to its mounting surface (not shown). This feature becomes particularly important when the outer face member is fixedly attached to some structural surface such as by press-fit or the like. For example, in an aircraft type application, a new inner member may be inserted quickly and efficiently without disturbing any other part of the aircraft except that part which is directly attached to the inner member 20.

An additional very important feature of the present invention is that the inner member can be sized by varying the dimension of the convex outer surface as defined by the segments 26. By varying this dimension certain bearing wear, which may be experienced by the inner concave surface of the outer member 12, can be accommodated, thereby maintaining the overall bearing tolerance of the bearing assembly 10.

An additional very important feature of the present invention is that it inherently embodies a second or redundant bearing surface. In particular, the inner surfaces 28 of the segments 26 and the outer surface 30 of the spool member 22 may define a second bearing surface. This bearing surface can become particularly important in a situation where there may be interference between the inner member and the outer member at the bearing surface defined by the concave inner surface of the outer member 12 and the convex outer surface of the inner member 20. Upon any such interference, which may be caused by corrosion, dirt or the like, the above noted second bearing surface between the spherical segments 26 and spool member 22 could then provide for a degree of movement. This movement can be further enhanced by treating the various surfaces with a self-lubricating plastic such as polytetrafluoroethylene.

The annular lips 24 may be so shaped such that their outer surface would be a continuation of the spherical surface of the segments. Additionally, the outer surface of the annular lips may be defined by a number of other forms such as a chordal section subtending the spherical surface defined by the outer surface of the segments 26. Additionally, the annular lips may be reduced in size to a point where they merely maintain the axial position of the segments 26 on the spool member 22 but are not involved in any way with the bearing surface area of the segments 26.

As before mentioned, the present invention provides a marked improvement in the ability to service spherical bearings in the field without displacing or otherwise dislodging the outer race member. This is accomplished without any compromise in the bearing performance or characteristic such as a reduction in the overall bearing surface which is typified by the prior art bearings such as the messerschmidt type ball spherical bearing.

From the above description of the invention along with various figures as set forth in the drawings it will be readily seen and appreciated that a spherical bearing embodying the concept of the present invention will positively and effectively accomplish the objectives of the invention. The above-noted embodiment is shown by way of example without attempting to show all the various forms and modifications in which the invention might be embodied; the invention being measured by the appended claims and not the specific details of the specification.

I claim:

1. A spherical bearing assembly having an inner race member and an outer race member, the inner surface of the outer race member having a concave spherical surface, the outer surface of the inner member having a complimentary convex spherical surface, said inner member having a unitary spool member, at least three spherical segments interlocked in an axial direction on said spool member, said spool member has two annular lips one disposed at each end thereof, said annular lips maintaining said segments on said spool so as to mechanically interlock them on said spool member when said inner member is in its operational position, said annular lips of said spool member have an outer surface which is a chordal section, subtending the convex spherical surface of said inner member.

* * * * *